United States Patent [19]

Aeschlimann et al.

[11] 4,136,955
[45] Jan. 30, 1979

[54] APPARATUS FOR CORRECTING THEODOLITES

[75] Inventors: Heinz Aeschlimann; Rene Nunlist, both of Aarau; Rudolf Stocker, Uster, all of Switzerland

[73] Assignee: Kern & Co. AG, Aarau, Switzerland

[21] Appl. No.: 718,375

[22] Filed: Aug. 27, 1976

[30] Foreign Application Priority Data

Sep. 2, 1975 [CH] Switzerland ............... 11348/75

[51] Int. Cl.² .............. G01B 11/26; G01C 1/00; G01D 5/34
[52] U.S. Cl. .............................. 356/152; 33/281; 33/283; 33/366; 33/377; 33/391; 33/1 T; 33/1 PT; 250/231 SE; 250/237 G; 356/141; 356/149
[58] Field of Search ............................. 33/281–286, 33/291, 366, 377, 391, 1 T, 1 PT; 250/237 G, 231 SE; 356/110, 138, 140, 149, 141, 152, 5

[56] References Cited

U.S. PATENT DOCUMENTS

| 2,883,594 | 4/1959 | Alberts | 318/648 |
| 2,943,529 | 7/1960 | Baker | 33/282 |
| 3,617,131 | 11/1971 | Taguchi | 356/149 |
| 3,657,551 | 4/1972 | Lingert et al. | 33/366 |
| 3,729,260 | 4/1973 | Walsh | 356/110 |
| 3,945,129 | 3/1976 | Bergkvist | 33/391 |
| 3,985,448 | 10/1976 | Wiklund et al. | 250/237 G |

OTHER PUBLICATIONS

AGA, Geodimeter Model 700 (Brochure), Mar. 2, 1972, 356-365.

Primary Examiner—S. C. Buczinski

[57] ABSTRACT

The corrected values to compensate for errors in instrumental levelling of a theodolite and similar instruments are found by determining angles of elevation and/or horizontal directions, measuring the instrumental levelling errors, and calculating the error free values of the instrument.

9 Claims, 11 Drawing Figures

APPARATUS FOR CORRECTING THEODOLITES

BACKGROUND OF THE INVENTION

The present invention relates to surveying instruments, whose actual readings, particularly the angle of elevation or horizontal direction azimuth, are subject to levelling errors when the instrument is erected and particularly to a theodolite having integrally connected apparatus for determining the levelling errors of the instrument and providing a corrective signal for error-compensation.

Various arrangements for stabilizing the spatial orientation of optical systems are known, as well as to compensate for the deviation from an ideal position. To stabilize entire instruments, it is known to mount them on a gyroscopic platform. The expense connected with this arrangement is a serious disadvantage. There has also been used means, for example, gyroscopes, spirit levels, pendulums and the like, as a reference for analyzing the rotary motion of an instrument. Thus the deviation of the instrument from its true level position can be automatically compensated by displacement of an optical element and/or the optical ray path. Such direct compensation results in extraordinarily large difficulties, particularly where incremental measuring methods are used, since instrumental vibrations result in ambiguities and averaging problems. In contrast to scale or code readings with a defined zero, incremental systems measure only directional variances by counting of individual or single steps during the movement from one direction to another. To modify the extent of such movement being defined by the aiming points by an amount corresponding to the error in horizontal orientation, cannot be successfully accomplished with the use of simple means.

The object of the present invention is, therefore, to provide surveying apparatus whose readings based on scale or code systems or for the incremental system can be faultlessly corrected with relatively low cost and at high satisfaction.

The foregoing objects, other objects as well as the numerous advantages of the present invention, are set forth in the following disclosure.

SUMMARY OF THE PRESENT INVENTION

According to the present invention, a surveying instrument such as a theodolite is provided with means for measuring the instrumental levelling errors as well as the usual readings and with a computer which calculates the error free values of the instrument, thereby compensating for the errors in levelling.

In one embodiment, the corrected numerical value corresponding to a horizontal direction determined by a target is calculated. The measured value for any direction may be observed as an electrical signal obtained by photoelectric conversion, electrical counting and interpolation of the periods (fringes) of a moire pattern passing through a scanning device. The value of the instrumental levelling error is taken from the control current which serves to operate a position regulating circuit of a rotary coil driven pendulum. The corrected direction is automatically calculated by the computer from the measuring values present and may be shown digitally.

In another embodiment, the instrumental levelling error is determined by the output signal of a Schottky-Barrier (SB) photodiode fixedly mounted on the instrument and illuminated by a light ray reflected from the surface of a liquid mirror. A device using a moire pattern is capable of producing an output measuring signal for the computer to calculate the correct value.

The moire pattern may be scanned by a "Self-Scanned Photodiode Array" converting the same to an electrical scanning signal which may then be processed by a charge amplifier, an integrator and a "Sample-Hold Circuit", the signal phase of the scanning signal is determined by an analog-digital "Phase-Locked-Loop Circuit" (PLL).

Full details of the present invention are set forth in the following description and illustration in the accompanying drawings of the invention and its preferred embodiments.

DESCRIPTION OF THE INVENTION

Figure 1:
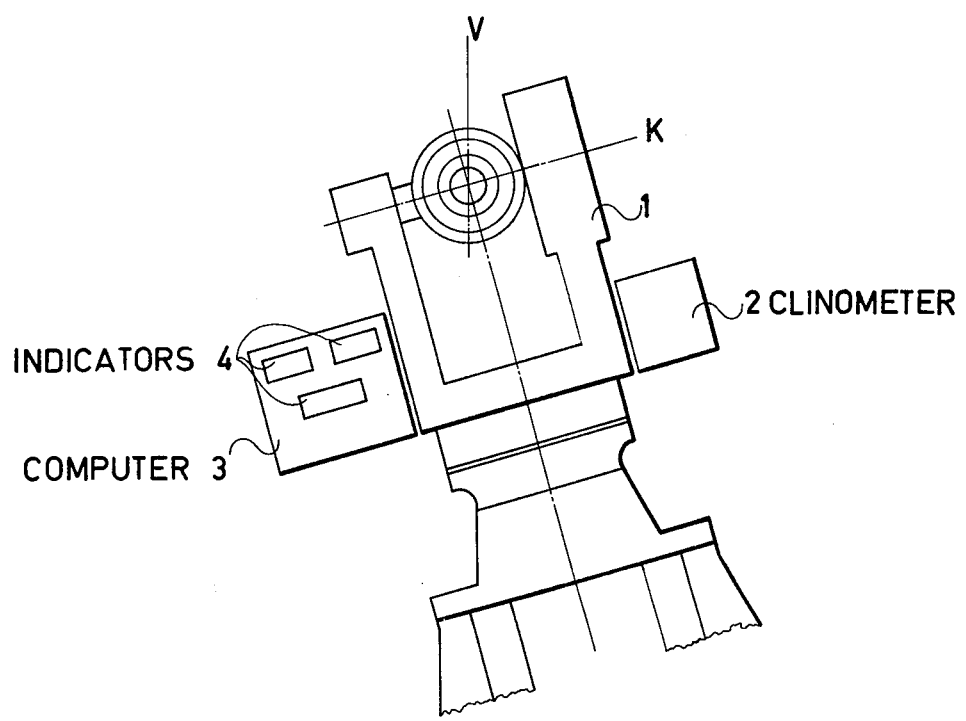
FIG. 1 is a view of a theodolite illustrating the tilt axis error, inclination measuring device and a computer having an indicator.

The present invention is broadly illustrated in FIG. 1 in which is shown a theodolite of known construction, generally depicted by the numeral 1, with its transverse horizontal tilt axis K deviated from its position normally perpendicular to the true vertical axis V (or plumb line). This deviation is detected by a clinometer 2 secured to the side piece of the frame of the theodolite. The clinometer 2 produces an output signal which is fed to the input of a computer 3 which also processes signals from an opto-electrical horizontal direction and elevation detector.

Examples of the clinometer 2 will be described in connection with FIGS. 5 and 6. Details about opto-electrical horizontal direction detectors and elevation detectors are already known to those skilled in the present art and further description here is only given in connection with Moire pattern interpolation. This will be done by the description in connection with FIGS. 7 and 8. A general lay-out of the computer will be described in connection with FIG. 9. Reference for supplemental information about standard usable opto-electrical horizontal and vertical direction detectors can be made to:
German DT-AS No. 1,548,704 — Hock, Heitmann
Swiss CH-PS No. 327,772 — Williamson, Shepherd, Walker
British GB-PS No. 782,831 — Dyson
French F-PS No. 2,113,114 — Wieg, Preston In order to digitally indicate the error in tilt axis position and the corrected horizontal directions and angles of elevation, the computer 3 is further provided with indicator devices 4.

The method for calculating the correct values thereby compensating for tilt error is based upon the geometrical relationships inherent between the theodolite elements and the horizontal and vertical directions and bearings.

Figure 2A:
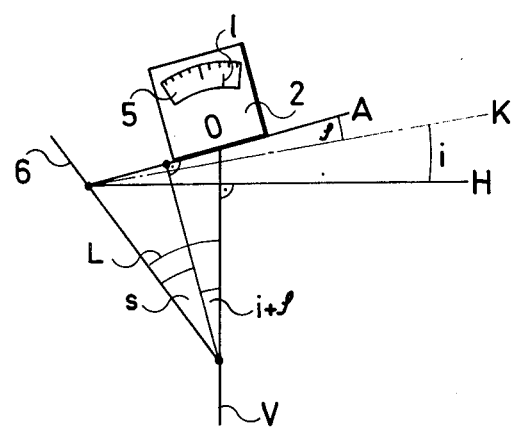
FIGS. 2a and 2b show the geometric situation of the instrument relative to the several axes appearing on the inclination measuring device before and after turning it by 180°, respectively.
Figure 2B:
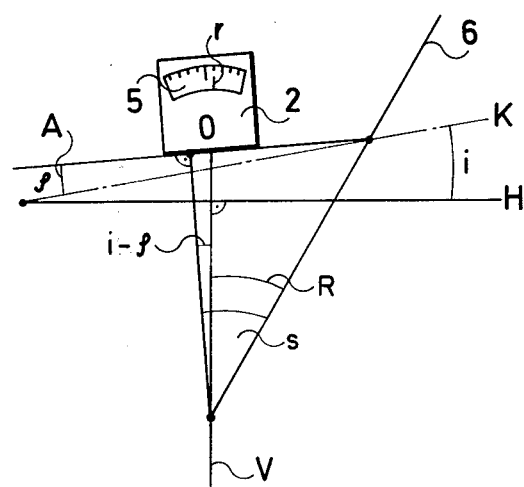

FIGS. 2a and 2b illustrate the angular relationship between the true horizontal plane, indicated by the letter H, the tilt axis K of the theodolite inclined at an angle i with respect to the horizontal plane H, this inclination causing the errors in instrumental reading and being measured by the clinometer, etc., and the axis A of a clinometer 2, which in actual practice, the clinometer might take, and which deviates from K by an angle $\varphi$.

In FIGS. 2a and 2b, a clinometer 2 with analog indicator 5 for illustrative purpose mounted on the instrument is shown. The error in levelling which occurs between the tilt axis K and the horizontal axis H is defined by the angle i. This angle may be eliminated by two settings of the clinometer 2, one in a first position as seen in FIG. 2a, the second by turning the instrument head (i.e., rotating its alidade) 200 grads (or 180°). FIG. 2b shows the situation after such turning. Numeral 6 indicates a null angle reference direction, the angle $\varphi$, indicates the unknown axis error of the device 2 and s the angle between the reference direction 6 and a line perpendicular to the axis A. If L or R define the angle between the vertical plumb line V (zenith) and the reference line 6 in FIG. 2a or FIG. 2b, then we find $$L = s + (i + \varphi)$$

and $$R = s - (i - \varphi)$$

or $$i = \tfrac{1}{2}(L - R).$$

Briefly, as seen in FIG. 2a, the angle A6H is equal to $(i + \varphi)$. Because of the perpendicular intersection of the true vertical V with axis H, the angle between the true vertical V and the perpendicular line to axis A is also $(i + \varphi)$. Similar geometric and trigonometric analysis will indicate the correctness of the value $(i - \varphi)$ for the similar angle of FIG. 2b. The indicator 5 shows the analog value 1 or r for angles L or its counterpart R.

Figure 3:
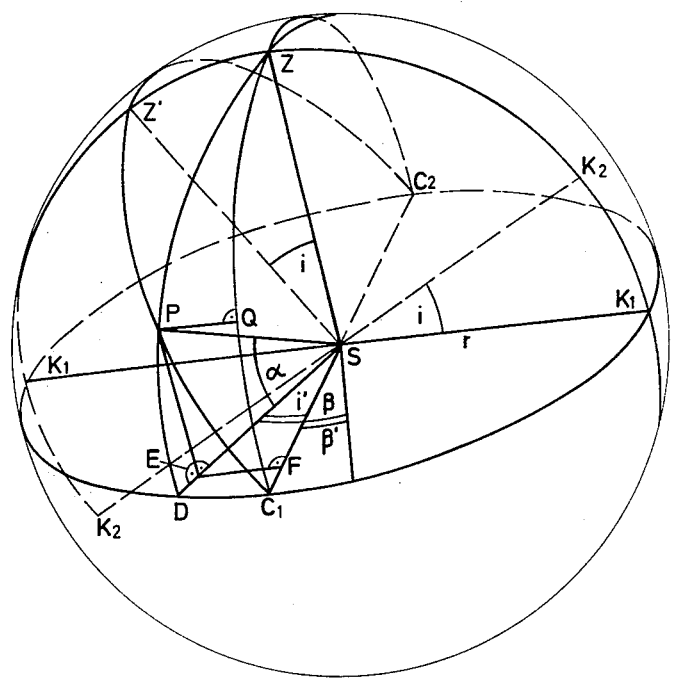
FIG. 3 illustrates the relationship between the tilt axis and the error in horizontal direction of the theodolite, in three dimensions.

Referring now to the three-dimensional diagram of FIG. 3, the horizontal plane is defined by $\overline{C_1C_2}$ and $\overline{K_1K_1}$, $\overline{K_1K_1}$ indicating an ideally horizontal position of the instrumental tilt axis. $\overline{C_1C_2}$ and $\overline{K_2K_2}$ show the position, the plane of the instrumental horizontal circle might have in practice, the tilt axis being now at an inclined position $\overline{K_2K_2}$. Note that the plane $\overline{ZS}$, $\overline{K_1K_1}$ vertical to the horizontal plane and $\overline{Z'S}$, $\overline{K_2K_2}$ vertical to the plane of the instrumental horizontal circle are parallel.

From the error in tilt axis, that is angle i, an angle of error i' in a horizontal direction $\beta'$ can be determined. As a result of the error i, the sight line SP will move in the plane $C_1PZ'C_2$ instead of in the plane $C_1QZC_2$. Thus, if a point P is sighted, it would be projected toward the point $C_1$ instead of at the point D. The angle i' between the erroneous projection and the desired correct projection is equal to $DSC_1$ formed between the planes DPZ and $C_1QZ$ and constitutes the error of the measured horizontal direction when sighting on the point P at an elevation $\alpha$.

It should be pointed out that the angle $\alpha$ appears actually, as will be described later, between the sight line $\overline{SP}$ and the projection of this line on the plane $\overline{C_1C_2}$, $\overline{K_2K_2}$ parallel to the horizontal circle of the theodolite. Inspite of that, in a first approximation the angle $\alpha$ is taken between the sight line and its projection on the horizontal plane as $\overline{K_1K_1}$, $\overline{C_1C_2}$.

In the triangle ESF, the sin i' = EF/ES and in the right triangle PEF, parallel to the plane formed by ZSZ' the tan i = EF/EP. Since the angle $\alpha$ is determined by triangle PSE, PS being the radius of length r, the sin $\alpha$ = PE/r and cos $\alpha$ = ES/r. Thus, sin i' = r sin $\alpha \cdot$ tan i/r cos $\alpha$ = tan i $\cdot$ tan $\alpha$. For small errors i in the tilt axis, the error in the horizontal direction can be defined as i' = i $\cdot$ tan $\alpha$.

The computer 3, as shown in FIG. 1, calculates as will be described herein from both (a) the inclination values R and L of the clinometer 2, and (b) the measured horizontal direction $\beta'$, a corrected horizontal direction $\beta = \beta' + \tfrac{1}{2}(L - R) \cdot \tan \alpha$.

In FIG. 3, it was assumed that the plane defined by the horizontal and actual erroneous tilt axes $K_1K_2ZZ'K_1K_2$ is parallel to the vertical direction. If this is not the case, then there will exist a general error in horizontal orientation. This means that an arbitrary spatial position of the reference plane for the measuring values (being rigidly fixed to the instrument, e.g. the horizontal circle plane) relative to the horizontal plane will occur. FIG. 4a shows two views of a theodolite coordinate system (X, Y, Z) being fixed to the instrumental lower body (i.e., to the tripod). The Z-axis extends upwardly perpendicular to the plane of the paper. The (X, Y) plane defines the instrumental base, that is, the horizontal circle plane. The (X, Z) plane defines the principal plane for the clinometer measurement. A clinometer which is secured on the lower body will measure the angular deviation of the X and Y axes from the horizontal plane.

Each target point is accociated with measuring values $\varphi$, $\alpha$, $\delta_x$ and $\delta_y$ wherein:

$\varphi$ = the horizontal angle between the target sight line or direction, projected on the (X, Y) plane, and the X-axis, measured from X toward Y;

$\alpha$ = the angle of elevation between the target sight line, projected on the (X, Y) plane, and the target sight line itself, measured from the (X, Y) plane;

$\delta_x$ is the angular deviation of the X-axis from the true horizontal plane. When the $\delta_x$ is greater than zero, then the X-axis lies above the horizontal plane;

$\delta_y$ is equal to the angular deviation of the Y-axis from the true horizontal plane. When $\delta_y$ is greater than zero, then the Y-axis lies beneath the horizontal plane.

In the case wherein the instrumental base plane (X, Y)$_o$ is ideally levelled, the values for each target point P are $\varphi_o$, $\alpha_o$, $\delta_{x_o}$ and $\delta_{y_o}$, $\delta_{x_o}$ and $\delta_{y_o}$ being always equal to zero. The values for $\varphi_o$ and $\alpha_o$ can then be obtained from the instrumentally measured values by the following mathematical transformations.

$$\varphi_o = \varphi + \varphi_1 + \varphi_2$$

and $$\alpha_o = \alpha + \alpha_1 + \alpha_2,$$

wherein $$\varphi_1 = \tan \alpha \, (\delta_x \sin \varphi + \delta_y \cos \varphi),$$

$$\varphi_2 = \sin 2\varphi/4 \, (\varphi_1{}^2 - [\delta_x{}^2 + \delta_y{}^2]),$$

$$\alpha_1 = \delta_x \cos \varphi + \delta_y \sin \varphi$$

and $$\alpha_2 = - \varphi_2{}^1/2 \tan\alpha.$$

$\varphi_2$ and $\alpha_2$ are small corrections of the second order.

The measurement of inclination is thus independent on rotation of the upper body or alidade of the theodolite. If, on the other hand, as shall now be supposed, the inclinometer is fixed to the alidade of the theodolite, one can take constantly $\varphi = 0$, (the target point lies in the (X, Z) plane) and the measured clinometer values $\delta_x$ and $\delta_y$ are now dependent on alidade rotation. Also in this condition, each target point P is associated with two measuring values a and $\alpha$, as well as with two values for levelling error $\delta_x$, $\delta_y$, namely:

a = the horizontal direction, with arbitrary null reference (corresponds to $\beta'$ of FIG. 3 for general conditions discussed here);

$\alpha$ = the angle of elevation mesured from the horizontal circle plane of the theodolite;

$\delta_x$ = the angular deviation of the plane of the horizontal circle from the horizontal plane measured in the direction of the target;

$\delta_y$ = the angular deviation of the plane of the horizontal circle from the horizontal plane measured perpendicular to $\delta_x$.

By using the formula, $a_o = a + a_1 + a_2$ and $\alpha_o = \alpha + \alpha_1 + \alpha_2$ and $\varphi = 0$, one can calculate then, for the instance of the ideal horizontal levelling of the apparatus, the horizontal direction and the angle of elevation as follows:

$$a_o = a + \delta h d y \cdot \tan\alpha$$

$$\alpha_o = \alpha + \delta_x - \frac{(\delta_y)^2}{2} \tan \alpha \, (\approx \alpha + \delta_x).$$

Figure 5:
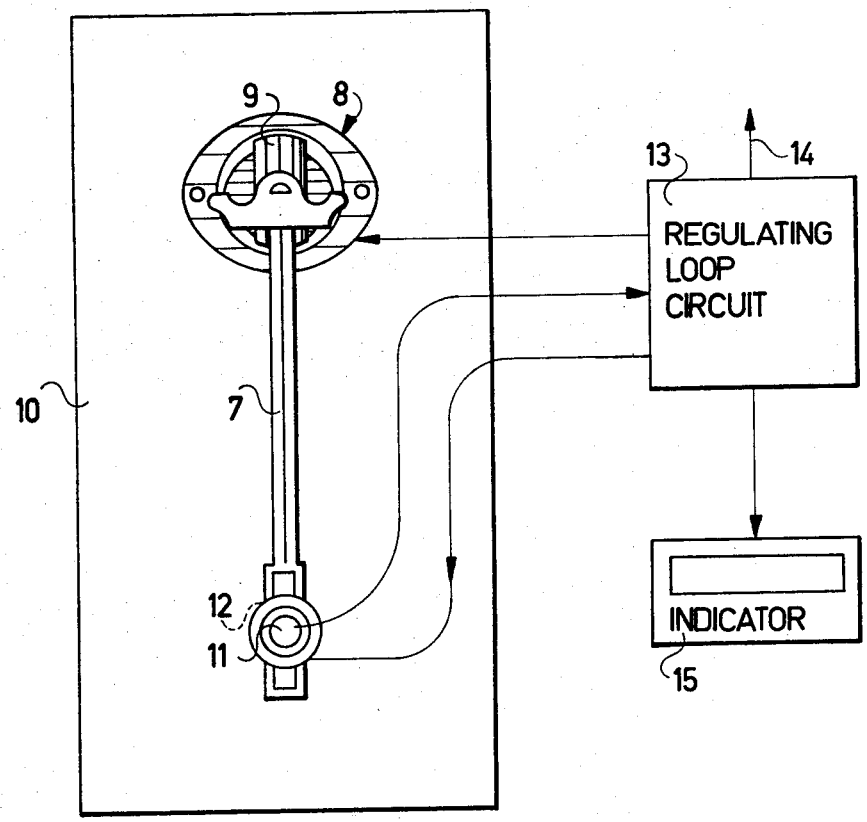
FIG. 5 illustrates one embodiment for determining the instrumental levelling error utilizing a pendulum driven by a rotary coil with position regulating circuit.

In FIG. 5, there is illustrated one apparatus, according to the present invention, for determining the error in horizontal levelling of the theodolite comprising a rigid pendulum 7 mounted at one end to a wire wound rotary coil 9 perpendicular to the axis of rotation; the coil being journalled by a stretched ribbon in a frame, in the manner of galvanometer or similar system 8. The system 8 is mounted on a base body 10. A pair of photodiodes 11 is mounted on the body 10 adjacent the lower end of the pendulum 7. The diodes 11 are illuminated through a slit-shaped opening in the pendulum by a light-emitting diode 12 (not visible) which is in a similar manner securely mounted on the body so that the output signal obtained in a known manner as the difference signal of the diodes changes with the position of the pendulum. To compensate for any change in position of the journal axis of the coil 9 of the measuring device, the pendulum 7 may be provided with a light weighted arm indicator (not shown) extending toward the top, and a second photoelectric reading system arranged diametrically to the system 11 and 12. The electrical output signals of both of these reading systems can then be suitably combined and summed.

The output of the diodes 11 is connected by a suitable conductor to an electronic system, depicted by the numeral 13, which is also connected to the light-emitting diode 12 and the coil 9 by suitable conductors. The electrode system 13 includes an automatic position regulating loop circuit of known design by which the relative angular position of the rotary coil 9 may be kept constant by a control current signal to the coil, corresponding to the difference in the photoelectric signals from photodiodes 11, even if there are changes in the inclination of the body 10. This control signal, in the form of current signal, serves also as a measure of inclination of the apparatus as a whole to the direction of gravity (i.e. tilt), and is imposed on an output 14 which is fed to the computer 3 and/or on an indicator 15. In case large angles of inclination are to be considered, one can take into account with the computer 3 (FIG. 1) the fact that the signal on the output 14 will be proportional to the sine of the angle of inclination.

The function of the apparatus so far described should be, without further details, clear.

Figure 6:
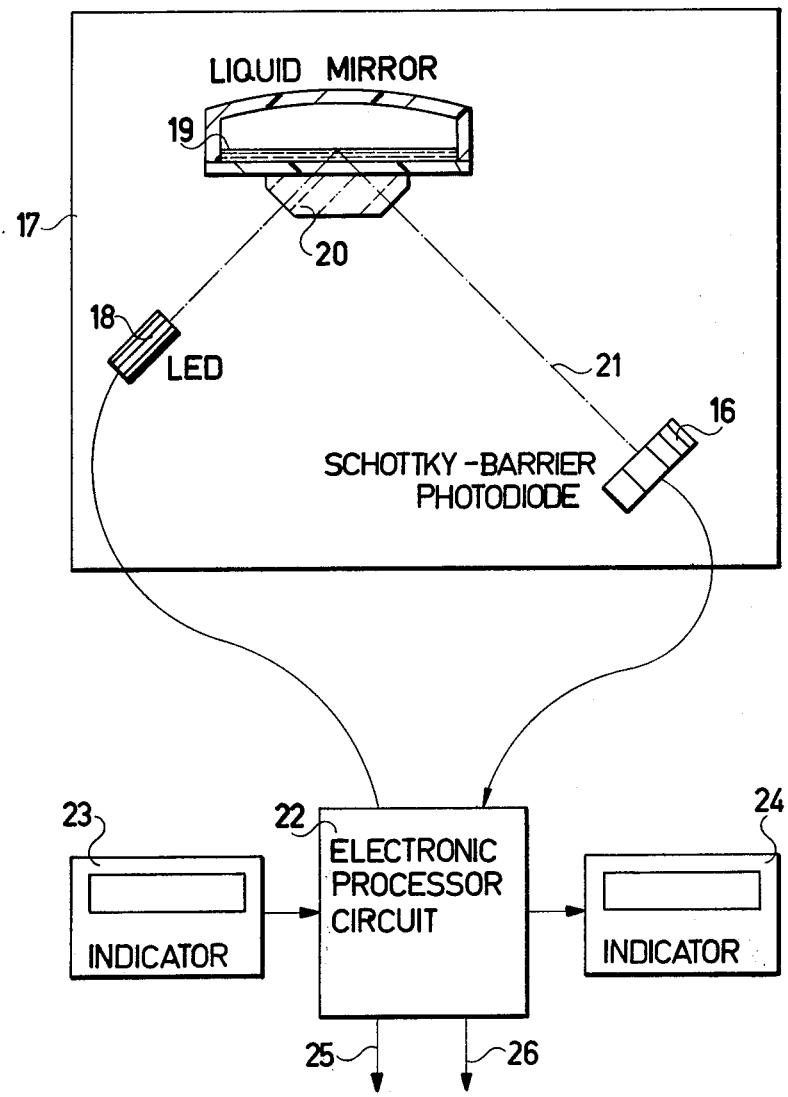
FIG. 6 illustrates a second embodiment for determining the instrumental levelling error utilizing a Schottky-barrier photodiode, a liquid level, illumination and evaluating electronics.

A second means according to the present invention for measuring angles of inclination is shown in FIG. 6. This means is suited for two coordinate measurement. A two coordinate responsive Schottky-Barrier (SB) photodiode 16 is mounted on a base plate 17 secured to the frame of the theodolite instrument. A Schottky-Barrier photodiode, as is known in the art, is a semiconductor photodiode of which one electrode has an extended light sensitive surface with e.g. four electric connections at its circumference, these connections receiving different amounts of current according to their distance from a light spot on the extended surface. The SB-photodiode 16 is illuminated by a light-emitting diode 18 via the reflective surfaces of a liquid mirror 19, having a transparent glass wall and a matching prism 20 on which light rays 21 are incident. The diameter of the light beam 21 is small relative to the light responsive face of the photodiode 16, and the relative position of the incidence point and therefore the relative amounts of the resultant current signals are dependent upon the inclination of the base plate 17. An electronic circuit 22 supplies the current power for the light-emitting diode 18 and processes the output signals of the SB-photodiode 16 over the illustrated conductors. The circuit 22 converts the signals into outputs for indicating apparatus 23 and 24 for each of the two inclination components respectively and provides electrical output pulse signals for the computer 3 on the outputs 25 and 26. Further details of the construction of the liquid mirror optics between elements 16 and 18, pulse drive for the LED 18, analog-digital processing and counting of the measuring signal, etc., will be evident to the person skilled in the present art, although they lie simultaneously in the scope of the present invention. The proper function of the described apparatus depends on the constant and stable horizontal position of the liquid mirror 19. The light beam 21 reflected from the mirror 19 by total reflection is determined in its relative position by the combination of four output signals from the four signal outputs of the SB-photodiode 16. Thereby the inclination of the apparatus can be determined.

Figure 7:
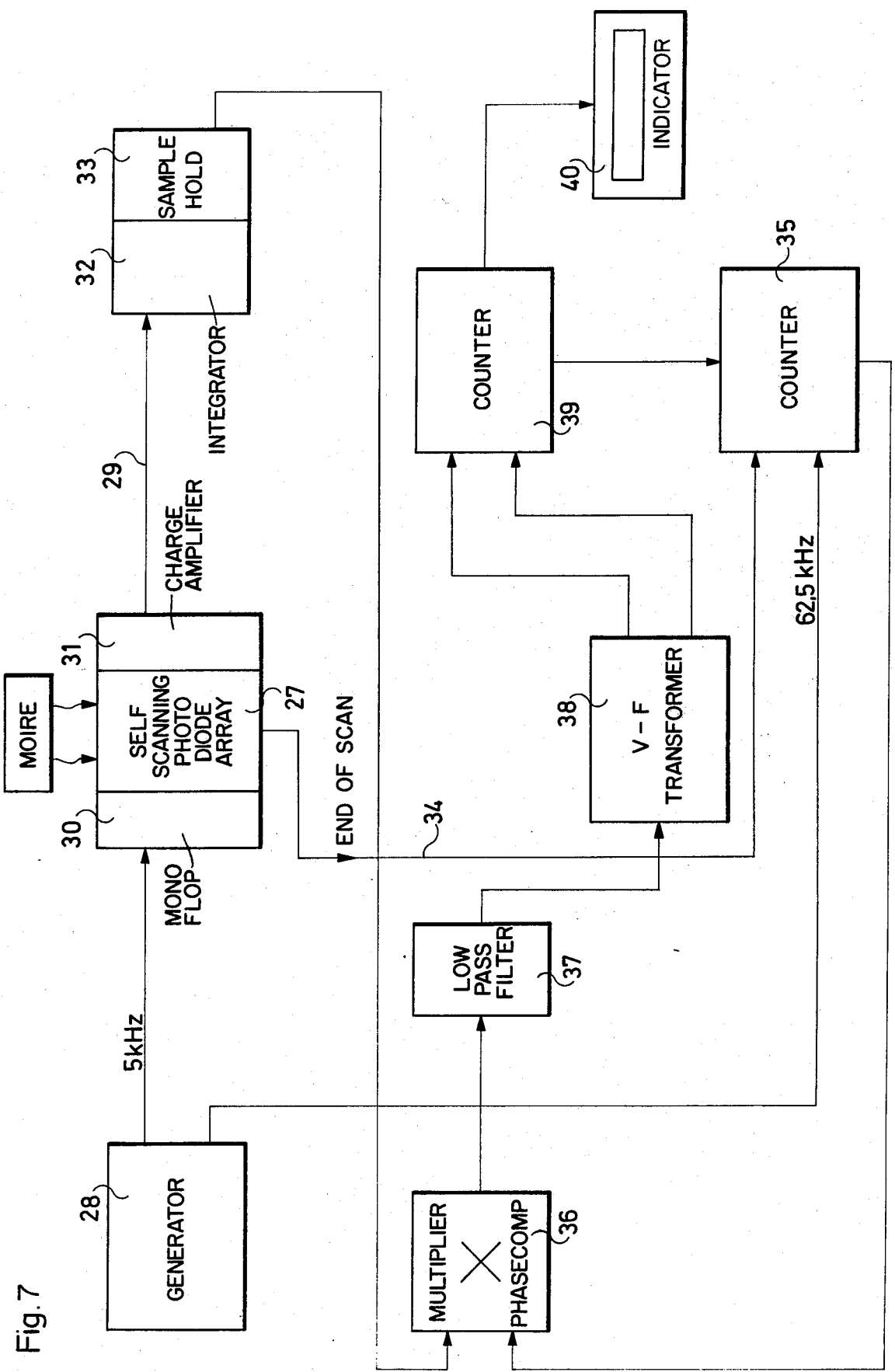
FIG. 7 is a circuit diagram of a Self-Scanned Photo Diode Array with evaluating electronics for scanning the moire pattern.

FIG. 7 shows a diagram of a circuit system for exactly determining and interpolating the relative position of a moire pattern. Such an array or pattern may, in known manner, be used to measure electro-optically even small changes in direction. In the present case a sector of the graduated circle of the instrument is projected through suitable enlargement or reduction on a diametrically opposite sector of the circle for generating such a moire pattern to be photo-electrically scanned. The moire pattern is formed of parallel light and dark relatively movable stripes, which run together by rotating the angle, that is the graduated circle. The number of stripes passing by a scanner can be counted by a sufficiently quick counting system. A fraction of the moire pattern must subsequently be correctly interpolated. The interpolation system has a time constant suitable for temporal averaging of vibration and noise. A dynamic measuring method can then be advantageously used, wherein no additive measurement errors result.

The circuit according to FIG. 7 works with direct electro-optical scanning or sensing of the moire pattern (similar to T.V. - scanners). To this end, a "Self-Scanned Photodiode Array" 27 is used (e.g. solid state line scanner RL-64P, Reticon Corp., Mountain View, California); that is, a linear arrangement of, for example, 64 photodiodes on a semi-conductor chip. An oscillator or generator 28 delivers a 5kHz.-signal triggering a monoflop 30, to the array 27 to cause the diodes to serially read the information from the moire pattern and to provide a video signal output over conductor 29. The video signal passes through a charge amplifier 31, into an integrator 32 and a Sample Hold Circuit 33, at whose output the local brightness distribution of the moire pattern appears as a temporal step wave. The position of the moire pattern relative to the last scanning diode determines the temporal relation of the step wave relative to the sensing pulse (end of the scan) of this diode, which is delivered over the conductor 34 from the array 27.

To measure this temporal position an analog-digital Phase Lock Loop System (PLL) is employed. It comprises, amongst others, a counter 35, which counts a 62.5kHz. signal from oscillator-generator 28 and which is re-set by the end of the scan signal passed over the conductor 34. The outputs of the counter 35 and the Sample Hold Circuit 33 are connected to the input of a multiplierphase comparator 36. The resultant product signal is switched via a low pass filter 37 and a voltage to frequency transformer (VFO) 38 with plus and minus outputs to an up/down counter 39 to which is connected an indicator 40.

The function of this (PLL) circuit can briefly be described as follows: The counter 35 supplies at its output a rectangular or square wave signal with a temporal period equal to the video (step wave) signal at the output of Sample-Hold Circuit 33. The phases of both signals are compared in the multiplier-phase comparator 36 and the phase of the square wave signal from the counter 35 is re-set, after each period, for a time until both it and the video signal are shifted out of phase by 90°. The shifting of the square wave signal from the counter 35 relative to the end-of-scan signal on conductor 34 is available on the counter 39 for digital display on a display 40. In stable condition of this circuit, this shift of the signals is equal to the phase shift of the moire pattern on the scanner element 27 relative to the end-of-scan signal and therefor is equal to the interpolation angle. The described embodiment which can be generally called an interpolator provides a maximum digital displacement value of 800 on the counter 39 each single step of the counter 39 corresponding to an angle of ¼ cc (centesimal).

In principle, the PLL circuit produces a square wave signal, from counter 35, whose phase is locked to the phase of the step wave signals from S.H. switch 33.

Figure 8:
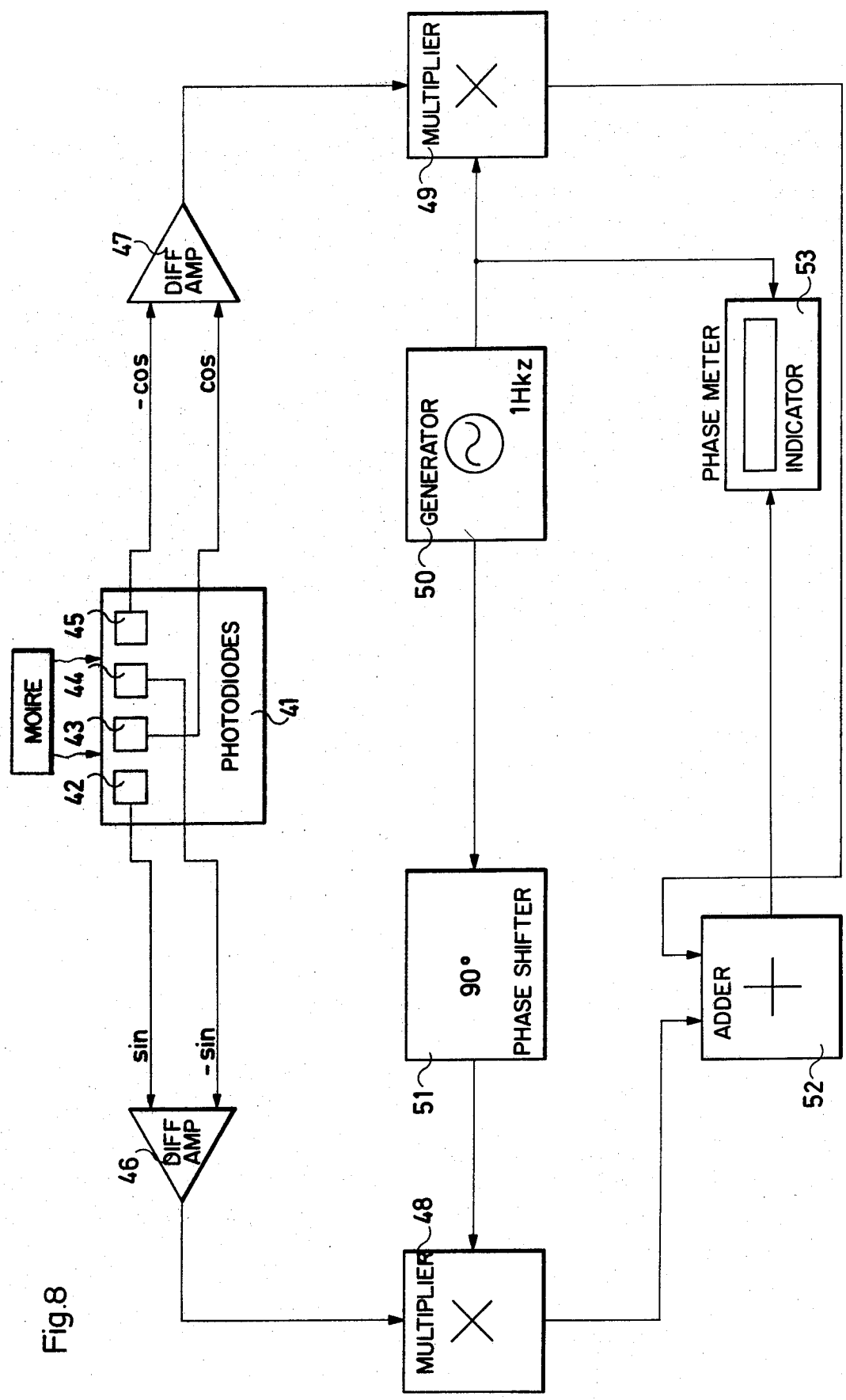
FIG. 8 is a circuit diagram of a system of four photoelectric receivers in line with evaluating electronics.

A further circuit for scanning or interpolating the moire pattern is seen in FIG. 8. Here, the moire pattern is simultaneously scanned by a system 41 of four photodiodes 42, 43, 44 and 45 arranged in a row or line. Each diode covers one-fourth of a moire period. The levels of the photoelectrical output signals of the diodes 42, 43, 44 and 45 are approximately proportional to the functions of sine, cosine, -sine, -cosine of the directional angle $\varphi$ of a given moire fringe. The system 41 is connected to two differential amplifiers 46,47 which process the signals sin $\varphi$, $-\sin \varphi$ and cos $\varphi$, $-\cos \varphi$. The output signals of these amplifiers 46 and 47 are multiplied in multipliers 48, 49 with respectively a 1 kHz. reference signal sin wt or cos wt supplied from an oscillator - generator 50 with a 90° - phase shifter 51. The product signals are summed in an adder 52. A phase meter 53 with an indicator produces an interpolation angle $\varphi$ from the summed signal cos (wt $-\varphi$) from the adder 52 and the reference signal cos wt from the oscillator - generator 50.

The function of this interpolation circuit is clarified using the addition theorem $$\cos (wt - \varphi) = \cos wt \cdot \cos \varphi + \sin wt \cdot \sin \varphi.$$

The sum of both products signals of the multipliers 48 and 49 constitutes an oszillation cos (wt $-\varphi$), phase shifted on the signal (cos wt) of the oscillator 50 by the interpolation angle $\varphi$. This phase angle is digitalized in the phase measuring apparatus 53.

Figure 9:
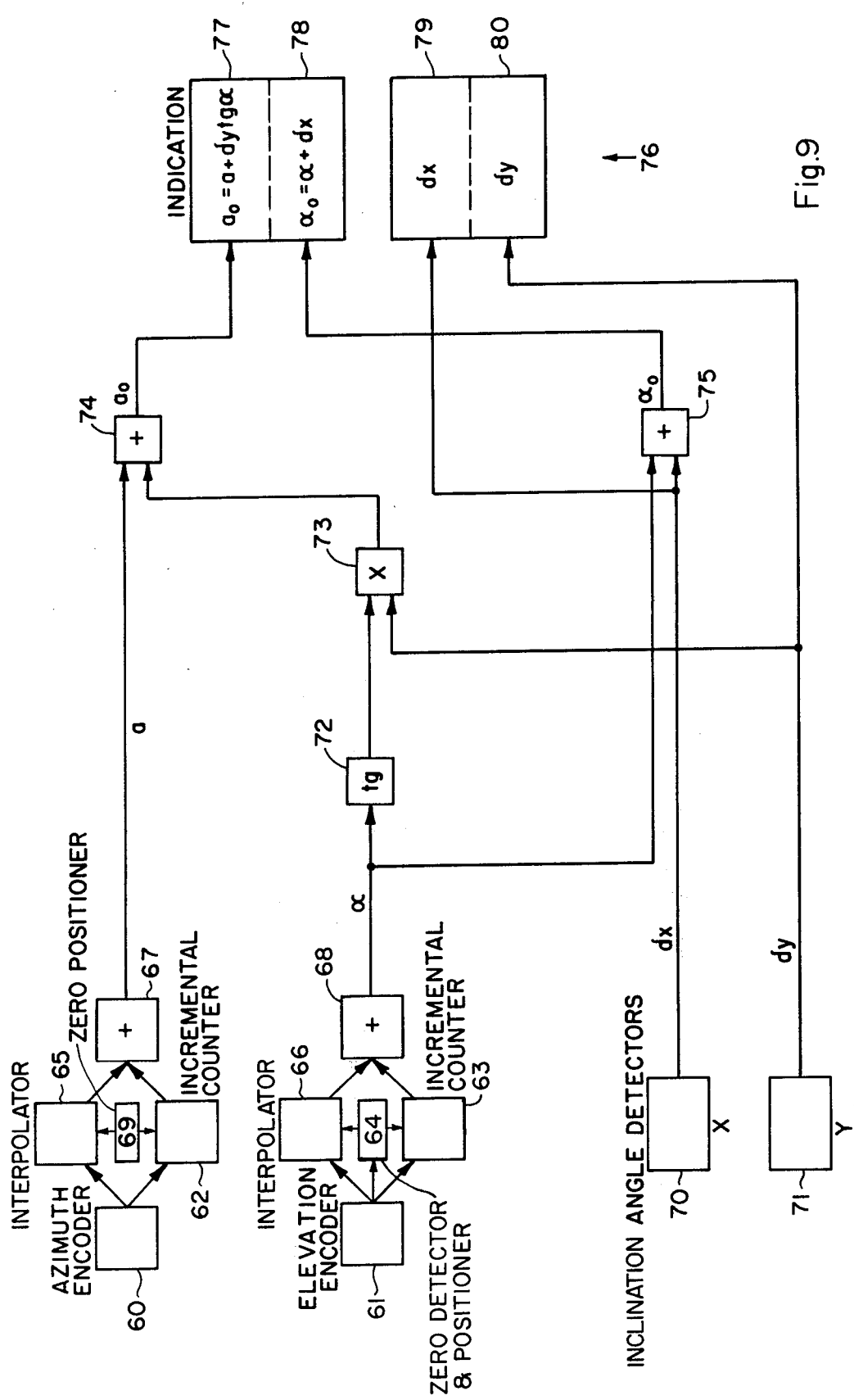
FIG. 9 is a block diagram of computer apparatus for computing the error free values to compensate for instrumental levelling errors.

In the block diagram of FIG. 9 there are shown two angle encoders 60 and 61 to determine the horizontal directtion (azimuth) a and the angle of elevation $\alpha$. By these angular indicators, electrical angular step pulses are derived which are summed respectively in the subsequently arranged incremental counters 62, 63, taking into account their correct sign. In order to simplify the operation, the angle of elevation must be measured directly without the need for subsequent or later zero correction. In order to do this, a null detector 64 with a null mark on the vertical graduated circle of the theodolite is needed which, by swinging of the theodolite telescope through the vertical axis of the instrument, automatically sets the increment counter 63 to zero.

The counters 62 and 63 are arranged with interpolators 65, 66 (for example, as described with FIG. 7 or FIG. 8). The intermediate values from the interpolators 65 and 66 are respectively added to the incremental sums from 62 and 63 in adders 67 and 68. The interpolation null point $0^{cc}$ (zero centesimal seconds) is set by electronic adjustment. The horizontal graduated circle is not provided with a null marker. The directional value of each individual target point can, however, be brought to $0^g$, $0^c$ and $0^{cc}$ by activation of a zero setting circuit 69.

Figure 4B:
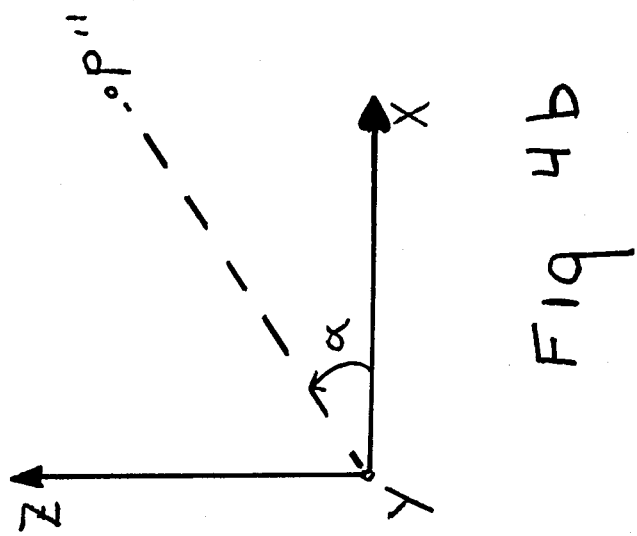
FIGS. 4a and 4b are representations of the geometric situation in a theodolite having an instrumental levelling error for mathematically correcting the measuring values.
Figure 4A:
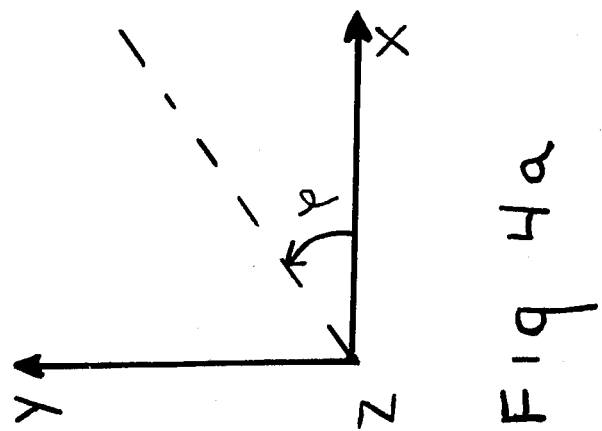

In addition to providing the values a and α, inclination measuring devices 70 an 71 (for example, according to FIG. 5 and FIG. 6) provide the angular deviations $\delta_x$ and $\delta_y$, as defined with FIG. 4, in the form of electrical signals. From these values, a computer device, for example, in the form of a known programmable microprocessor, can determine the correct directional and angular values $a_o$, $\alpha_o$, according to the mathematical transformation formulae shown in connection with FIG. 4. This process is schematically illustrated by a tangential-functional unit 72 which produces the tan α, a multiplier 73 which produces $\delta_y \cdot \tan \alpha$ and an adder 74, for calculating:

$$a_o = a + \delta_y \cdot \tan \alpha,$$

as well as a second adder 75 which computes the elevation angle $$\alpha_o = \alpha + \delta_x.$$

These results are fed in electrical form, together with the inclination components $\delta_x$ and $\delta_y$, to an indicator unit 76. The indicator unit has four windows 77, 78, 79 and 80. The first window 77 shows the corrected horizontal direction $a_o$; the second window 78 shows the corrected elevational angle $\alpha_o$: the third window 79, the inclination $\delta_x$ of the apparatus in the target direction, and the fourth window 80 the inclination $\delta_y$ of the apparatus in the direction perpendicular thereto. The indication of the inclination of the apparatus or instrument can be used to obtain the fine adjustment of the horizontal levelling of the apparatus.

In addition to the described embodiment, the present invention as well as other embodiments may be employed, for example, to measure the path of a projectile and file control system.

From the foregoing, it will be clearly seen that the values corrected for the compensation of errors in horizontal levelling of the theodolite, either the angles of elevation or the horizontal directions can be easily obtained. In doing so, the photoelectric sensing apparatus shown in FIGS. 5 and 6 (i.e., the pendulum and Schottky-Barrier photo-electric systems) measure simultaneously the two components $\delta_x$ and $\delta_y$ of the levelling error.

In each instance, the corrected values are digitally displayed.

Various modifications, changes and embodiments have been suggested, others may be obvious to those skilled in the art. This disclosure is therefore to be taken as illustrative of the present invention and not limiting thereof. In the event any portion of my Swiss Application, No. 11 348/75, is not specifically set forth herein, the same is made reference to as if more fully disclosed. Reference may also be made to the following for more complete details of specific elements and electronic components employed herein:

| List of standard or commercial items of suitable electronic components which may be used in the computer | | | |
|---|---|---|---|
| Ref. No. | Function | Manufacturer | Catalog No. |
| 72 to 75 | "slide rule calculator" | National Semiconductor Corp. Santa Clara California 95051 | MM 5760 |
| 72 to 75 | calculator programmer | same | MM 5765 |
| 72 to 75 | quad-switch | RCA | CD 4066 A |
| 72 to 75 | decoder-switch | RCA | CD 4667 B |
| 72 to 75 | counter 7-stage | RCA | CD 4024 A |

-continued

| List of standard or commercial items of suitable electronic components which may be used in the computer | | | |
|---|---|---|---|
| Ref. No. | Function | Manufacturer | Catalog No. |
| 77 to 80 | decoder | RCA | CD 4514 B |
| 72 to 75 | multiplexer dual | RCA | CD 4097 B |
| 72 to 75 | dual decoder | RCA | CD 4555 B |
| 77 to 80 | LC-display | RCA | CD 4056 A |
| Items of electronic components in the inclination apparatus | | | |
| 16 | Schottky-Barrier photo diode | United Detector Technology Santa Monica California | PIN SC/10 |
| 18 | diode | RCA | 3001 |

What is claimed is:

1. Apparatus for providing a relative measure of horizontal and vertical angles between first and second directions, comprising means to aim in said first and second directions, means to generate a periodic moire pattern with a relative position corresponding to the direction of said aiming means, four photoelectric receivers in line for sensing the relative position of said moire pattern, each of said receivers covering one fourth of one moire period and providing one signal of two pairs of electrical output signals in push-pull relationship, two differential amplifier means each connected to one of said push-pull output pairs, the differential output signals being in phase quadrature, a clock oscillator means having two output signals of corresponding phase quadrature, signal multiplier means, multiplying each differential output signal with one of the clock signals, forming two product signals, signal adding means, forming the sum of the two product signals and a phase meter for determining the phase difference between the output of said signal adding means and one of the clock signals, said phase difference being indicative of the relative position of said periodic moire pattern and of the direction of said aiming means.

2. Apparatus for providing a relative measure of horizontal and vertical angles between first and second directions, comprising means to aim in said first and second directions, means to generate a periodic moire pattern with a relative position corresponding to the direction of said aiming means, a self scanned linear photodiode array for sensing the relative position of said moire pattern, a charge amplifier, an integrator and a sample-hold circuit for processing the scanning signal of said array and an analog-digital phase-locked loop circuit (PLL) for determining the relative phase of said scanning signal, said phase being indicative of the relative position of said periodic moire pattern and of the direction of said aiming means.

3. Apparatus for providing a relative measure of horizontal and vertical angles between first and second directions, comprising means to aim in said first and second directions, means to generate electrical output signals indicative of the angle between first and second directions of said aiming means, a liquid mirror, a light source producing a collimated light beam which is reflected from the surface of said liquid mirror, a Schottky-Barrier fotodiode illuminated by said reflected light beam, an electronic processor circuit receiving the output signals of said Schottky-Barrier fotodiode and providing output signals indicative of levelling error and computer means generating from said angle and levelling error horizontal and vertical angles with levelling error compensation.

4. The apparatus according to claim 3, wherein said liquid mirror is housed in a container including a matching prism through which the collimated beam of said light source passes.

5. The apparatus according to claim 3, wherein said computer means for generating horizontal and vertical angles with levelling error compensation comprises a microprocessor means.

6. The apparatus according to claim 3, wherein said Schottky-Barrier fotodiode provides two independent output signals each being indicative of one of two components of levelling error.

7. Apparatus for providing a relative measure of horizontal and vertical angles between first and second directions, comprising means to aim in said first and second directions, means to generate electrical output signals indicative of the angle between first and second directions of said aiming means, a pendulum mounted to the coil of a galvanometric system, a light source, photoelectric receiver means mounted near the end of said pendulum and illuminated by said light source in dependence upon the attitude of said pendulum, a regulating loop circuit receiving the output signals of said photoelectric receiver means and activating said galvanometric coil by a regulating current to maintain said pendulum in a biased angular position, said regulating current being indicative of levelling error, and computer means generating from said angle and levelling error horizontal and vertical angles with levelling error compensation.

8. The apparatus according to claim 7, wherein said galvanometric coil is journalled by a stretched ribbon in a frame.

9. In an apparatus for providing a relative measure of horizontal and vertical angles between first and second directions with means to aim in said first and second directions, means to generate electrical output signals indicative of the horizontal and vertical angles between first and second directions of said aiming means, means to generate electrical output signals indicative of levelling error parallel to the direction of said aiming means and computer means generating, from said signals for the vertical angles and the levelling error, vertical angles with levelling error compensation the improvement comprising means to generate electrical output signals indicative of levelling error at right angles to the direction of said aiming means and computer means generating from said signals for the horizontal and vertical angles and the levelling error parallel and at right angles to the direction of said aiming means horizontal angles with levelling error compensation.

* * * * *

UNITED STATES PATENT AND TRADEMARK OFFICE
CERTIFICATE OF CORRECTION

PATENT NO. : 4,136,955
DATED : January 30, 1979
INVENTOR(S) : Heinz Aeschlimann; Rene Nunlist; Rudolf Stocker It is certified that error appears in the above-identified patent and that said Letters Patent are hereby corrected as shown below:

Col.5, line 19, change to read -- $\alpha_2 = - \dfrac{\psi_1^2}{2 \tan \alpha}$ --

Col.5, line 49, change to read -- $a_o = a + \delta_y \cdot \tan \alpha$ --

Col. 9, line 37, change "file" to -- fire --

Signed and Sealed this

Third Day of July 1979

[SEAL]

Attest:

LUTRELLE F. PARKER

Attesting Officer

Acting Commissioner of Patents and Trademarks